United States Patent
Tanaka et al.

(10) Patent No.: US 10,793,308 B2
(45) Date of Patent: Oct. 6, 2020

(54) PACKAGING SYSTEM

(71) Applicant: Ishida Co., Ltd., Kyoto (JP)

(72) Inventors: Masatsugu Tanaka, Ritto (JP);
Toshiyuki Sakata, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 261 days.

(21) Appl. No.: 15/013,609

(22) Filed: Feb. 2, 2016

(65) Prior Publication Data
US 2016/0229574 A1 Aug. 11, 2016

(30) Foreign Application Priority Data

Feb. 9, 2015 (JP) .................................. 2015-023511

(51) Int. Cl.
*B65B 59/00* (2006.01)
*B65B 61/26* (2006.01)
(Continued)

(52) U.S. Cl.
CPC ............ *B65B 59/001* (2019.05); *B65B 11/54* (2013.01); *B65B 35/20* (2013.01); *B65B 35/56* (2013.01);
(Continued)

(58) Field of Classification Search
CPC ....... B65B 57/10; B65B 57/00; B65B 59/001; B65B 59/003; B65B 11/54; B65B 35/20; B65B 35/56; B65B 49/02; B65B 49/08; B65B 51/16; B65B 57/04; B65B 57/14; B65B 61/26; B65B 67/10; B65B 41/16;
(Continued)

(56) References Cited

U.S. PATENT DOCUMENTS 4,458,470 A * 7/1984 Fine ........................ B65B 11/54
                        53/502
4,827,423 A * 5/1989 Beasley ............. G01N 29/2493
                        700/100
(Continued)

FOREIGN PATENT DOCUMENTS

DE     692 31 097 T2    11/2000
DE     100 12 579 A1    9/2001
(Continued)

OTHER PUBLICATIONS

The extended European search report issued by the European Patent Office dated Jun. 21, 2016, which corresponds to European Patent Application No. 16152509.2-1708 and is related to U.S. Appl. No. 15/013,609.
(Continued)

*Primary Examiner* — Dariush Seif
(74) *Attorney, Agent, or Firm* — Studebaker & Brackett PC

(57) ABSTRACT

A packaging system according to an aspect is a packaging system formed by connecting an external server to a plurality of packaging apparatuses via a network. The external server stores control parameters for the packaging apparatuses to package an article to be packaged in an optimal state. The packaging apparatus communicates with the external server, downloads necessary control parameters, and controls a packaging operation by using the downloaded control parameters. Accordingly, a setting operation performed in each of the packaging apparatuses can be significantly reduced.

20 Claims, 17 Drawing Sheets

(51) Int. Cl.
| | |
|---|---|
| *B65B 35/56* | (2006.01) |
| *B65B 49/08* | (2006.01) |
| *B65B 57/14* | (2006.01) |
| *B65B 35/20* | (2006.01) |
| *B65B 11/54* | (2006.01) |
| *B65B 51/16* | (2006.01) |
| *B65B 49/02* | (2006.01) |
| *B65B 67/10* | (2006.01) |
| *B65B 57/04* | (2006.01) |
| *B65B 57/10* | (2006.01) |
| *G05B 15/02* | (2006.01) |
| *H04L 29/08* | (2006.01) |
| *B65B 41/16* | (2006.01) |

(52) U.S. Cl.
CPC ............. *B65B 49/02* (2013.01); *B65B 49/08* (2013.01); *B65B 51/16* (2013.01); *B65B 57/04* (2013.01); *B65B 57/10* (2013.01); *B65B 57/14* (2013.01); *B65B 59/003* (2019.05); *B65B 61/26* (2013.01); *B65B 67/10* (2013.01); *G05B 15/02* (2013.01); *H04L 67/34* (2013.01); *B65B 41/16* (2013.01); *B65B 2210/04* (2013.01); *G05B 2219/31422* (2013.01); *G05B 2219/32019* (2013.01); *G05B 2219/45048* (2013.01)

(58) Field of Classification Search
CPC ..... B65B 2210/04; H04L 67/34; G05B 15/02; G05B 2219/31422; G05B 2219/32019; G05B 2219/45048
USPC .................................................. 53/556, 566
See application file for complete search history.

(56) References Cited

U.S. PATENT DOCUMENTS

| | | | | |
|---|---|---|---|---|
| 5,847,957 | A * | 12/1998 | Cohen | G06F 11/3006 700/108 |
| 6,877,297 | B2 * | 4/2005 | Armington | B31D 5/0047 53/502 |
| 7,299,103 | B1 * | 11/2007 | Dye | B29C 44/182 700/108 |
| 8,393,133 | B2 * | 3/2013 | Parmley | B65B 57/12 53/461 |
| 2001/0002574 | A1 * | 6/2001 | Miyazaki | B65B 61/26 101/35 |
| 2002/0004812 | A1 * | 1/2002 | Motoyama | H04L 12/5692 709/201 |
| 2002/0095230 | A1 * | 7/2002 | Bergo | G05B 19/4183 700/96 |
| 2002/0152726 | A1 * | 10/2002 | Oguri | B65B 7/164 53/442 |
| 2004/0123567 | A1 * | 7/2004 | McErlean | B65B 5/103 53/445 |
| 2004/0243277 | A1 * | 12/2004 | Bonnain | B65B 59/00 700/213 |
| 2006/0074697 | A1 * | 4/2006 | Yamaji | B65B 57/00 426/392 |
| 2008/0230439 | A1 * | 9/2008 | Abrams | G06F 1/18 206/723 |
| 2008/0295461 | A1 * | 12/2008 | Parmley | B65B 57/12 53/461 |
| 2010/0300049 | A1 * | 12/2010 | Schmidt | B65B 11/025 53/461 |
| 2013/0018503 | A1 * | 1/2013 | Carson | B65B 57/16 700/216 |
| 2013/0036198 | A1 * | 2/2013 | Galm | B41F 33/0009 709/217 |
| 2013/0047149 | A1 * | 2/2013 | Xu | G06F 8/61 717/175 |
| 2014/0165506 | A1 * | 6/2014 | Deppermann | B65B 43/44 53/471 |
| 2014/0223863 | A1 * | 8/2014 | Lancaster, III | B65B 11/008 53/436 |
| 2014/0223864 | A1 * | 8/2014 | Lancaster, III | B65B 11/008 53/436 |
| 2014/0233863 | A1 * | 8/2014 | Barrington | G06F 16/5866 382/305 |
| 2015/0378352 | A1 * | 12/2015 | Wetsch | B65B 3/04 700/97 |

FOREIGN PATENT DOCUMENTS

| | | |
|---|---|---|
| DE | 102 34 304 A1 | 2/2004 |
| DE | 102 37 933 A1 | 2/2004 |
| DE | 103 24 925 A1 | 12/2004 |
| DE | 10 2006 005 365 A1 | 8/2007 |
| DE | 600 34 311 T2 | 12/2007 |
| DE | 10 2007 024 217 A1 | 11/2008 |
| DE | 10 2010 029 952 A1 | 12/2011 |
| DE | 10 2011 011 896 A1 | 8/2012 |
| DE | 10 2013 005 769 A1 | 10/2014 |
| EP | 0 822 473 A2 | 2/1998 |
| EP | 0 978 711 A1 | 2/2000 |
| EP | 0 916 466 B1 | 10/2001 |
| EP | 1 150 185 A1 | 10/2001 |
| EP | 1 035 781 B1 | 3/2002 |
| EP | 1 213 668 A1 | 6/2002 |
| EP | 1591363 A1 | 11/2005 |
| EP | 1 880 820 B1 | 2/2012 |
| EP | 2555066 A2 | 2/2013 |
| JP | H5-305925 A | 11/1993 |
| JP | 2000-079902 A | 3/2000 |
| JP | 2001-184250 A | 7/2001 |
| JP | 2001-206320 A | 7/2001 |
| JP | 2002-326603 A | 11/2002 |
| JP | 2003-122652 A | 4/2003 |
| JP | 2003-261117 A | 9/2003 |
| JP | 2004-026313 A | 1/2004 |
| JP | 2004-238019 A | 8/2004 |
| JP | 2006-099300 A | 4/2006 |
| JP | 2009-253392 A | 10/2009 |
| JP | 2013-131001 A | 7/2013 |
| JP | 2013-244980 A | 12/2013 |
| JP | 2014-231367 A | 12/2014 |
| WO | 2007/059981 A1 | 5/2007 |
| WO | 2013/131863 A2 | 9/2013 |

OTHER PUBLICATIONS

King, Peter, "Network Communication for Assembly Equipment," SMT, Nov. 1998, 3 pages.
Ishida, "Flex-Line Solutions," 6 pages, www.ishidaeurope.com.
An Office Action mailed by the European Patent Office dated Apr. 29, 2019, which corresponds to European Patent Application No. 16152509.2-1016 and is related to U.S. Appl. No. 15/013,609.
Notification of Information Provision issued by the Japanese Patent Office dated May 28, 2019, which corresponds to Japanese Patent Application No. 2015-023511 and is related to U.S. Appl. No. 15/013,609; with English language translation.
An Office Action; "Communication of a notice of opposition," issued by the European Patent Office dated May 7, 2019, which corresponds to European Patent Application No. 16152509.2 and is related to U.S. Appl. No. 15/013,609.
An Office Action; "Communication of a notice of opposition," issued by the European Patent Office dated May 8, 2019, which corresponds to European Patent Application No. 16152509.2 and is related to U.S. Appl. No. 15/013,609.
A Notice of Allowance, "Decision to Grant a Patent", mailed by the Japanese Patent Office dated Aug. 20, 2019, which corresponds to Japanese Patent Application No. 2015-023511 and is related to U.S. Appl. No. 15/013,609; with English translation.

* cited by examiner

Fig.8

| COMMODITY NUMBER | TRADE NAME | UNIT PRICE | USABLE TRAY NUMBER | | | FILM NUMBER | |
|---|---|---|---|---|---|---|---|
| 001 | PORK SLICE | 200 | No.1 | No.2 | No.4 | No.1 | No.2 |
| 002 | BEEF THIN SLICE | 350 | No.1 | No.2 | | No.1 | |
| 003 | BEEF BLOCK | 400 | No.10 | No.12 | | No.2 | |
| . | | | | | | | |

Fig. 9

| TRAY INFORMATION | | | | | | USABLE FILM | CONTROL PARAMETERS | | | | | | | | |
|---|---|---|---|---|---|---|---|---|---|---|---|---|---|---|---|
| No. | TRAY CODE | HEIGHT | WIDTH | DEPTH | TARE WEIGHT | | FILM CUT LENGTH | | FRONT TENSION | | REAR TENSION | | STRETCH AMOUNT | SHIFT AMOUNT | TIGHTENING |
| | | | | | | | STANDARD | ADJUSTMENT | CENTER | RIGHT AND LEFT | CENTER | RIGHT AND LEFT | | | |
| 1 | XX-001 | 30 | 200 | 200 | 5 | No.1 | 450 | −2 | 0 | 0 | 0 | 0 | 0 | +1 | 0 |
| 2 | YY-123 | 25 | 240 | 170 | 7 | No.2 | 450 | 0 | +1 | −3 | +2 | +3 | +6 | +1 | 0 |
| | | | | | | No.2 | 480 | +10 | +2 | −2 | +2 | −2 | +4 | 0 | 0 |
| 3 | XX-AAA | 50 | 160 | 90 | 3 | No.2 | 400 | 0 | 0 | −1 | 0 | | +4 | +5 | 0 |
| · | | | | | | | | | | | | | | | |

Fig.10

| FILM No. | FILM WIDTH | ELONGATION RATE |
|---|---|---|
| No.1 | 400 | $\alpha$ |
| No.2 | 350 | $\beta$ |
| No.3 | 500 | $\gamma$ |

PACKAGING SYSTEM

TECHNICAL FIELD

The present invention relates to a packaging system which connects a plurality of packaging apparatuses to an external server via a network to allow the packaging apparatuses to share control parameters for the packaging apparatuses so as to package an article to be packaged in an optimal state.

BACKGROUND

As well known, perishable foods sold in supermarkets or the like are accommodated in a tray and wrapped by a stretch film having high stretchability. The wrapped commodities are manufactured by a so-called stretch packaging apparatus. The packaging apparatus pushes an article to be packaged from below toward the stretch film that is held in tension and folds the peripheral edge portion of the film toward the lower surface of the article to be packaged. In the packaging apparatus, the wrapped state varies depending on the size or shape of the tray to be used, the height of the accommodated contents, a difference in the elongation rate of the film to be used, and the like.

Therefore, in the case of using a new film having a different elongation rate or a tray having a non-registered size, the wrapped state is confirmed by trial packaging. In a case where wrinkles are formed in the film or the overlap margin of the film at the lower surface of the tray is not appropriate, adjustment is performed to achieve a wrapped commodity with good appearance by increasing or decreasing the tension of the film or the stretching length of the film.

In addition, when an optimal packaged state is achieved, control parameters at this time, for example, a film cut length corresponding to a tray size, a prestretch length by which the film is stretched in advance, tension, and the like are registered to correspond to the tray size (refer to Japanese Unexamined Patent Publication Nos. 2003-261117 and 2004-026313).

SUMMARY

However, in recent years, the types of films and the shapes of trays have been diversified, and there is a problem in that the above-mentioned adjustment operation has to be individually performed when a new film or a modified tray is used. Particularly, generally, this adjustment operation is performed by a provider who is well-informed of the features of the packaging apparatus. Moreover, adjustment performed by visiting each store needs significant time and costs. There is a demand for the improvement of this point.

An object of an aspect of the present invention is to provide a new packaging system capable of solving the problems.

An aspect of the present invention relates to a packaging system formed by connecting an external server to a plurality of packaging apparatuses via a network. The external server stores control parameters for the packaging apparatuses to package an article to be packaged in an optimal state. The packaging apparatus includes a communication unit which communicates with the external server and downloads the control parameters, a storage unit which stores the control parameters downloaded by the communication unit, and a control unit which controls a packaging operation on the basis of the control parameters stored in the storage unit.

The external server may be a server device which provides a well-known cloud computing service provided by a provider, a so-called a cloud, and may store the control parameters set by each of the packaging apparatuses. In this case, each of the packaging apparatuses can communicate with the cloud and download the necessary control parameters for the own apparatus via the network. Accordingly, an operation of setting or adjusting the control parameters performed on each of the packaging apparatuses by consuming time and effort can be omitted.

Each of the packaging apparatuses may be a stretch packaging apparatus which pushes up the article to be packaged from below toward a stretch film that is held in tension in a packaging station, and folds a peripheral edge portion of the film toward a lower surface of the article to be packaged. In this case, the control parameters stored in the external server are control values for each mechanism for packaging the article to be packaged in the optimal state. The control values are, for example, a film cut length corresponding to a tray size, a stretch length by which a film is stretched in advance, a delay time until a film is opened after a folding plate starts to come into contact with the film that is stretched in order to apply an appropriate tension to the film to be wrapped, and the like. In addition, the article to be packaged used here is typically perishable foods accommodated in a tray, and also includes fruits and vegetables which are not accommodated in a tray and wrapped with the film as they are.

In each of the packaging apparatuses, differences in films do not need to be considered in the case of using films having the same size and same material property. Accordingly, the external server may store control parameters determined by the size of an article to be packaged, typically, a tray size or the sizes of fruits and vegetables. For example, the film cut length is determined by the width and height of a tray, a prestretch amount of the film is determined by the depth and height of the tray, and a film opening timing is determined by the width and depth of the tray. Therefore, the external server may also store, as the control parameters, control values derived from the tray size, or default values for each size obtained by a predetermined calculation expression and adjustment values thereof. The adjustment value is an adjustment value obtained by first performing packaging using default values obtained as initial values and thereafter adjusting the default values to adjust the packaged state to an optimal packaged state.

The above-mentioned examples of the control parameters are directly specified from the size of the article to be packaged. However, there are some shapes of trays that cannot be specified only by the size of the trays. For example, regarding trays having a special shape (circular, or fan shape) and different material properties (hard and soft), the control parameters for packaging the trays in an optimal state vary. Therefore, in order to cause all of the trays to be regarded as subjects, a unique code (for example, tray code) may be assigned to each tray type, and control parameters may be stored for each code.

Similarly, since films have various sizes and material properties (elongation rate), a unique code (number) may be assigned to each film type, and control parameters may be stored for each code. In addition, when the film code and the tray code is input through an operation unit, control parameters for the film and the tray corresponding to the code may be read from a storage unit. Such a code may also be a code assigned by a tray provider or a film provider for versatility between different users.

These control parameters can be made only in the packaging apparatuses. Therefore, when control parameters for performing packaging by using a new commodity, a new tray, or a new film are uniquely set and registered in any packaging apparatus among the plurality of packaging apparatuses, the communication unit may upload the control parameters that are newly set and registered to the external server along with information regarding the article to be packaged. Accordingly, the new control parameters which are uploaded can be shared by the plurality of packaging apparatuses.

On the other hand, the communication unit of each of the packaging apparatuses may communicate the external server regularly or each time when the apparatus is started up and download the new control parameters. In addition, in a case where control parameters for a designated commodity, a tray, or a film are not stored in the storage unit, the communication unit inquires of the external server whether or not the control parameters are stored in the external server. When the control parameters are stored in the external server, the control parameters may be downloaded from the external server. Accordingly, in each of the packaging apparatuses, new control parameters do not need to be individually set, and thus an unskilled operator can package various articles to be packaged in an optimal state.

BRIEF DESCRIPTION OF THE DRAWINGS

FIG. 8 illustrates a commodity master table which is an example of a commodity master.

FIG. 9 illustrates a tray master table which is an example of a tray master.

FIG. 10 illustrates a film master table which is an example of a film master.

FIG. 11 is a view illustrating an example of an operation screen for manually registering control parameters.

FIG. 12 is a view illustrating an example of an adjustment screen for adjusting the control parameters.

DETAILED DESCRIPTION

Figure 1:
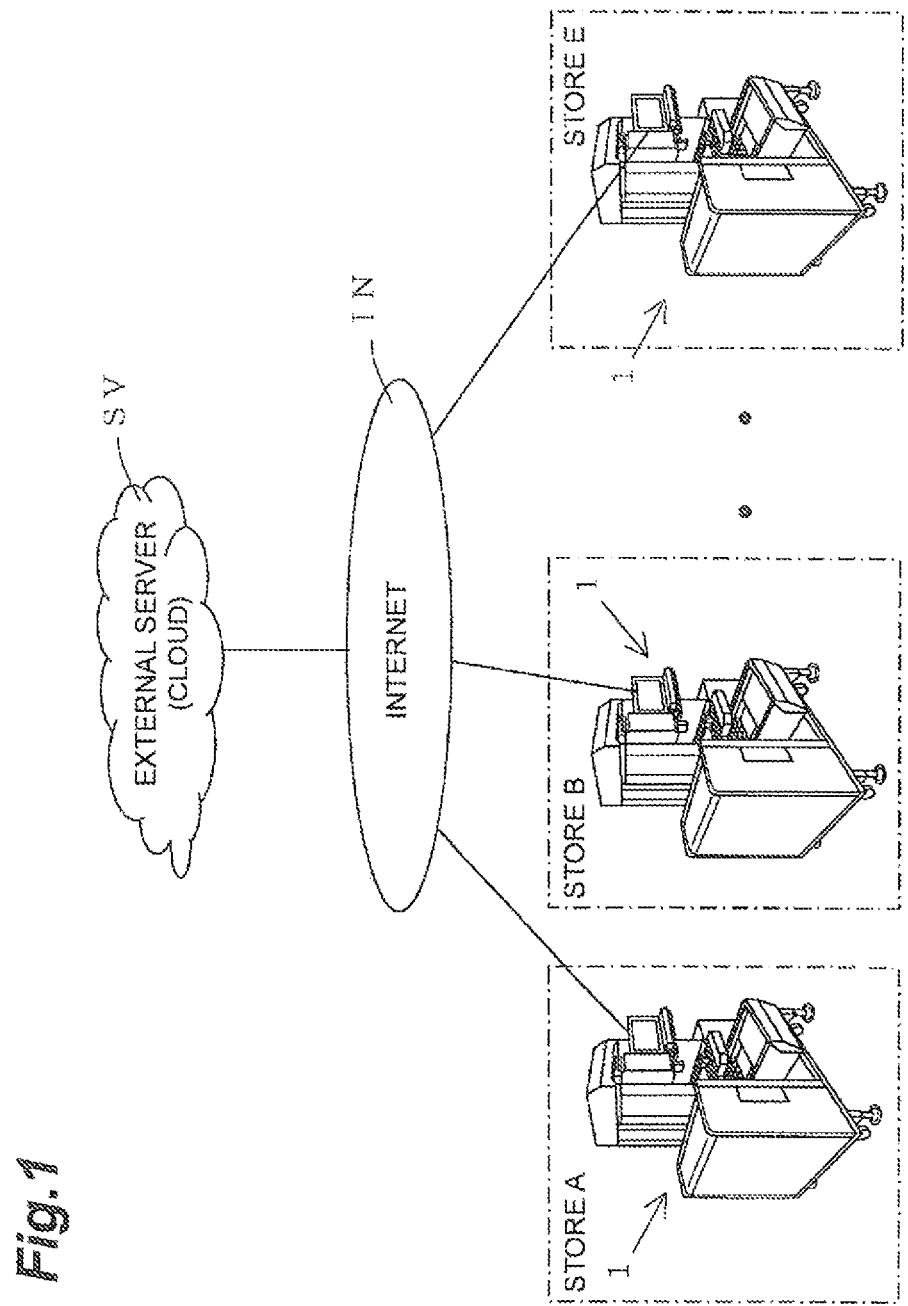
FIG. 1 is a schematic configuration view of a packaging system according to an embodiment of the present invention.

Hereinafter, an embodiment of the present invention will be described with reference to the drawings. In the description of the drawings, like elements which are the same or similar are denoted by like reference numerals, and overlapping description will not be repeated.

FIG. 1 illustrates a schematic configuration of a packaging system 100 in which a plurality of packaging apparatuses 1 are connected to an external server SV via Internet lines IN. In this figure, the external server SV is a server device which provides existing cloud computing services provided by providers, and stores control parameters used in each of the packaging apparatuses 1, which will be described later.

The packaging apparatuses 1 are provided in stores such as nationwide supermarkets, Each of the packaging apparatuses 1 includes a communication unit 90 which communicates with the external server SV and downloads the control parameters, a storage unit 9b which stores the control parameters downloaded by the communication unit 90, and a control unit 9c which controls packaging operations on the basis of the control parameters stored in the storage unit 9b.

Figure 2:
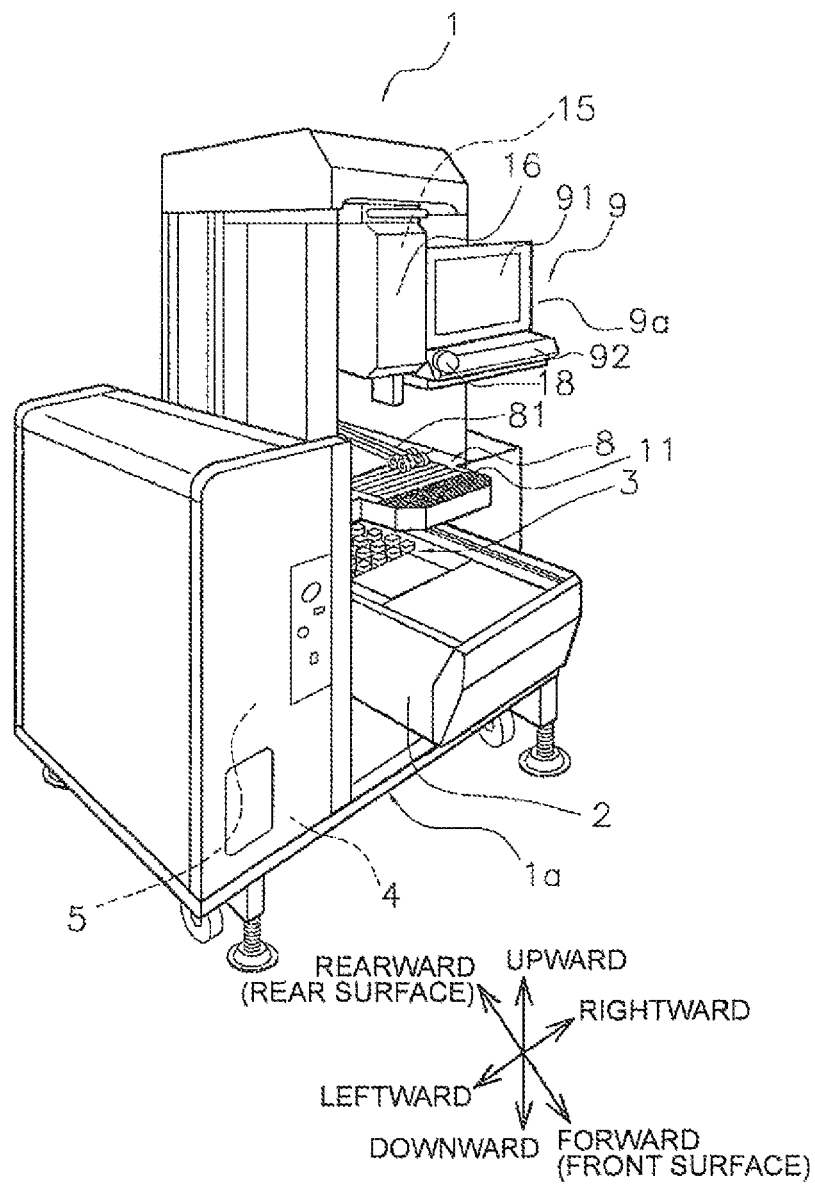
FIG. 2 is an external perspective view of a packaging apparatus used in the packaging system.
Figure 3:
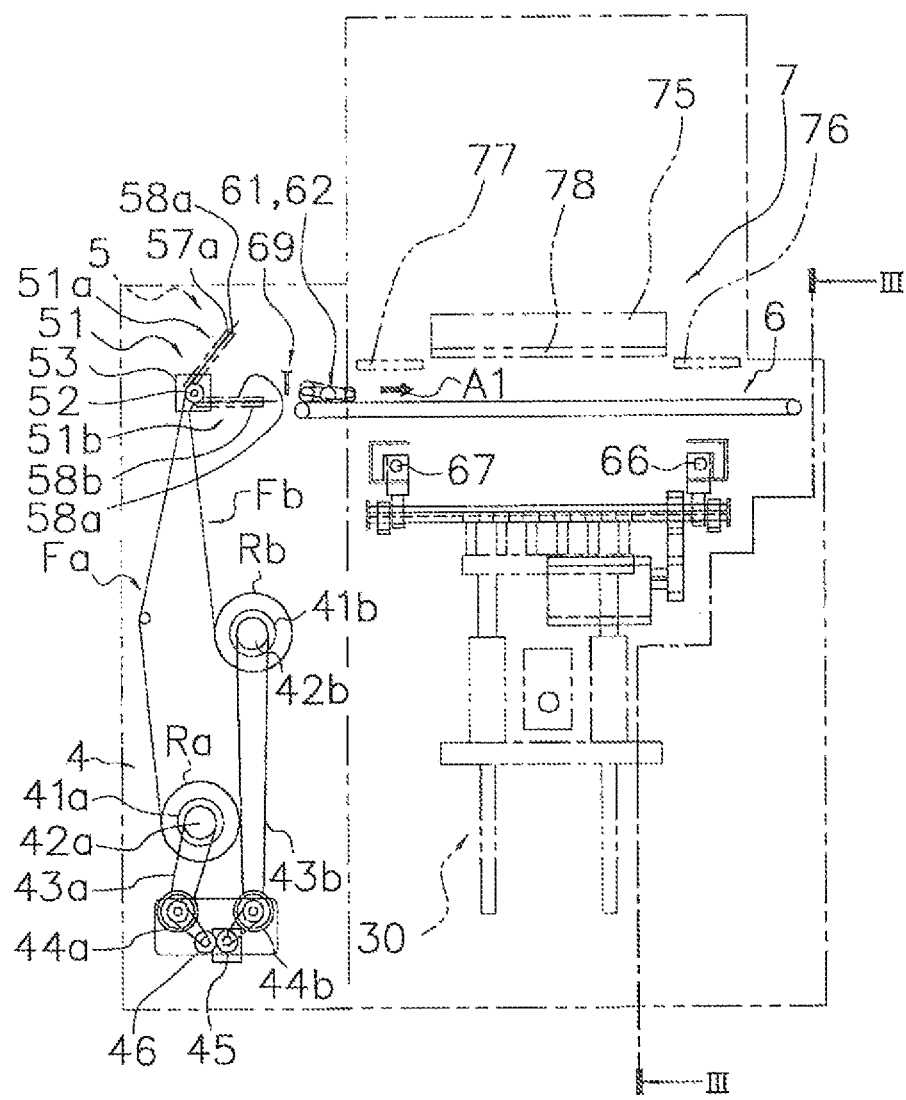
FIG. 3 is a front view of the internal configuration of the packaging apparatus.
Figure 4:
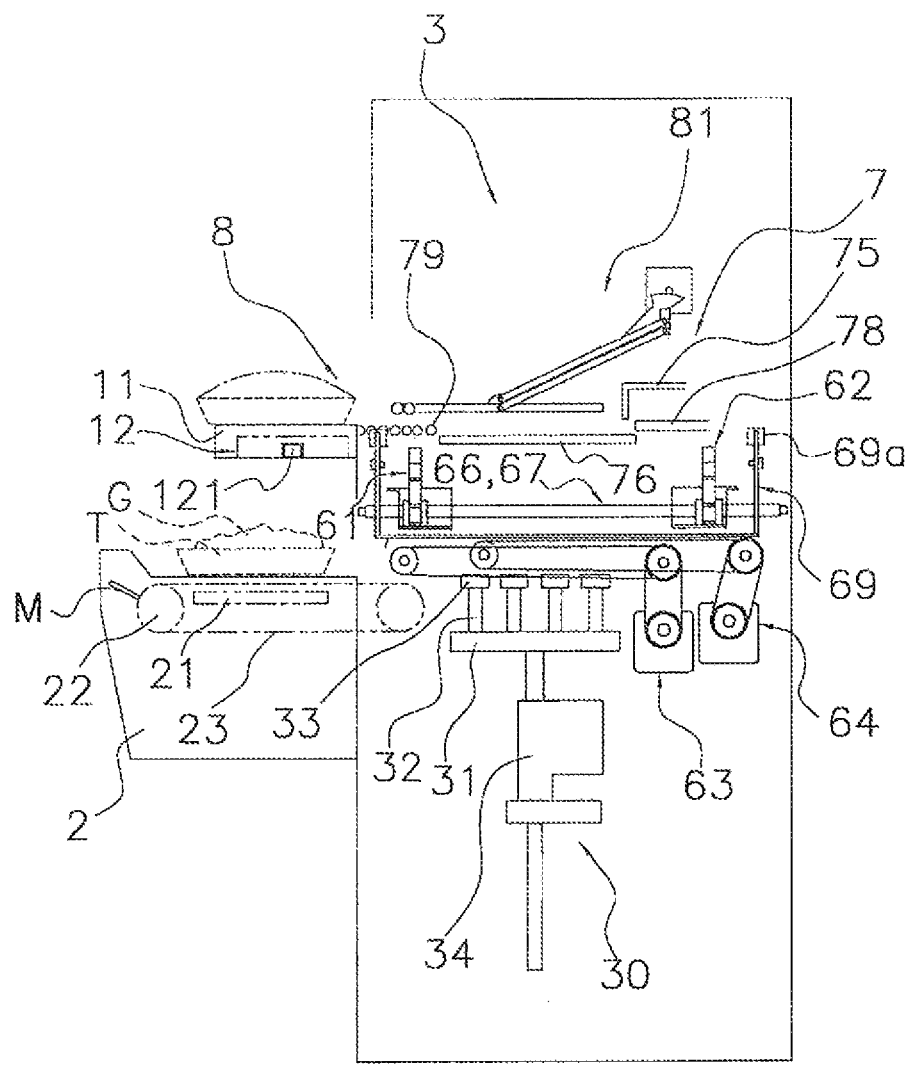
FIG. 4 is a sectional view taken along line III-III of FIG. 3.
Figure 5:
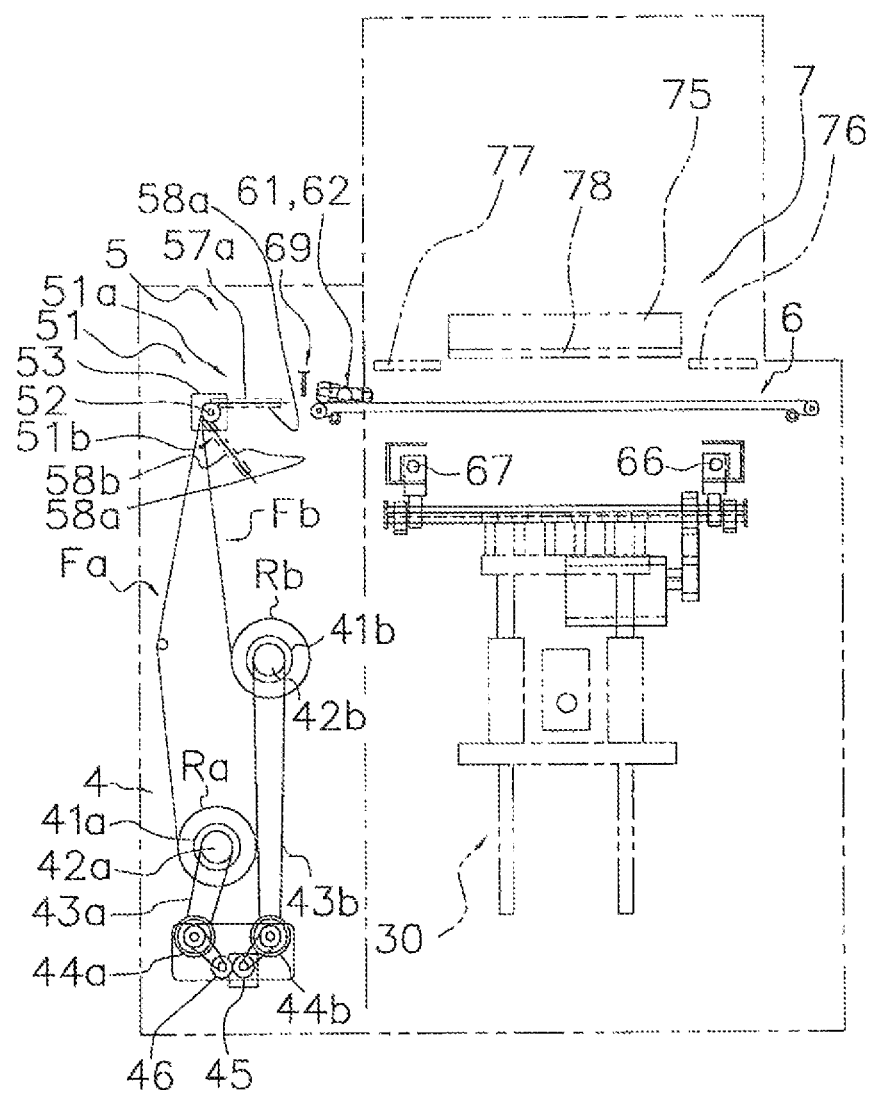
FIG. 5 is a front view of the internal configuration of the packaging apparatus.
Figure 6:
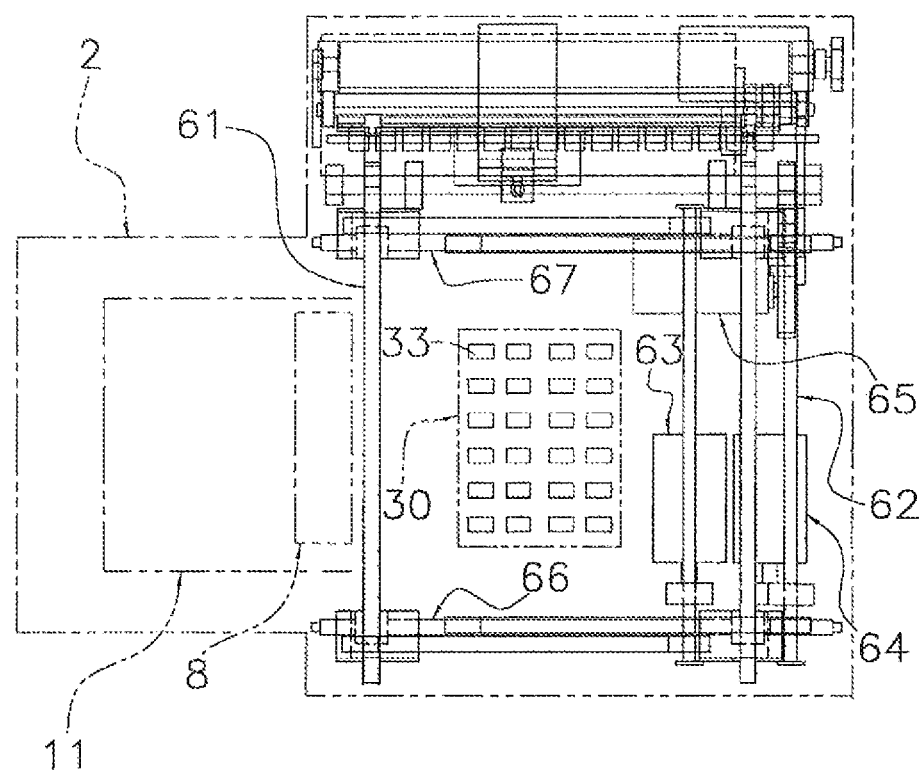
FIG. 6 is a plan view of the internal configuration of the packaging apparatus.

FIG. 2 is an external perspective view of the packaging apparatus 1. FIG. 3 is a schematic front view of the inside of the packaging apparatus 1. FIG. 4 is a sectional view taken along line III-III of FIG. 3. FIG. 5 is a schematic front view of the inside of the packaging apparatus 1. FIG. 6 is a schematic plan view of the inside of the packaging apparatus 1.

In the following description, expressions of directions such as forward, rearward, rightward, leftward, upward, downward, front surface, and rear surface are referred to as directions shown on the lower right side of FIG. 2, if not particularly specified. In addition, a film width direction is referred to as a direction perpendicular to a direction in which a film is fed, a film longitudinal direction is referred to as the direction in which the film is fed. In addition, a band-like film is referred to as a film while being pulled from a film roll before being cut. Furthermore, upstream and downstream are referred to as upstream and downstream with respect to the transport direction of the film.

First, the configuration of the packaging apparatus 1 will be schematically described. The packaging apparatus 1 pushes upward a tray T on which a commodity G such as perishable foods is accommodated against stretch films Fa and Fb, which are held in tension, and folds the peripheral portions of the films Fa and Fb which protrude from the tray T toward the bottom surface side of the tray T so as to wrap the tray T. The packaging apparatus 1 also has a weighing function or a pricing function by labeling, in addition to the film packaging function. In addition, packaging of the commodity G by the packaging apparatus 1 also includes the case of packaging exposed commodities G (for example, fruits and vegetables) as they are without accommodating the commodities G in trays T.

(1) Packaging Apparatus 1

In FIGS. 2 to 6, the packaging apparatus 1 includes an importing mechanism 2, a packaging station 3, a roll supporting mechanism 4, a film delivery mechanism 5, a film conveyance mechanism 6, a folding mechanism 7, a sealing mechanism 8, a discharge table 11, and a tray size detecting mechanism 12.

(1-1) Importing Mechanism 2

The importing mechanism 2 is provided in the front center portion of a main body 1a and functions as an importing unit when the tray T as an article to be packaged is imported into the main body 1a. As illustrated in FIG. 4, the importing mechanism 2 includes a weighing instrument 21 which measures the weight of the commodity G accommodated on the tray T, a weighing pan placed on the weighing instrument 21, and a plurality of importing belts 23 which are wound around front and rear pulleys 22. The importing belt 23 is provided with a lug M for transportation, and when the tray T is placed on the weighing instrument 21 (on the weighing pan), the weight of the tray T on which the commodity G is accommodated is measured by the weighing instrument 21. In addition, the front surface side of the tray T is pressed by the lug M fixed to the importing belt 23 by rotation of an importing belt drive motor (not illustrated) such that the tray T is fed onto a lifter mechanism 30 provided in the lower section of the packaging station 3.

(1-2) Packaging Station 3

The packaging station 3 is a packaging space formed inside the main body 1a and is adjacent to the importing mechanism 2. In the packaging station 3, a series of film packaging processes are performed for the tray T including the weighed commodity G In the packaging station 3, the stretchable films Fa and Fb are stretched by the film conveyance mechanism 6, which will be described later, and the lifter mechanism 30 pushes the tray T upward against the films Fa and Fb. In addition, the folding mechanism 7, which will be described later, advances toward the bottom surface of the tray T in a state in which the films Fa and Fb are stretched, in order to fold the films at the peripheral edge portions of the tray T toward the lower surface of the tray T. Accordingly, the tray T is packaged by the films Fa and Fb.

In the lower section of the packaging station 3, the above-mentioned lifter mechanism 30 is provided. The lifter mechanism 30 holds the bottom surface of the tray T and vertically moves the tray T. As illustrated in FIG. 4, the lifter mechanism 30 includes a support base 31, a plurality of support bars 32 fixed onto the support base 31, and support members 33 which are rotatably supported by the upper end portion of the support bars 32, respectively, to support the bottom surface of the tray T. In addition, in the lower section of the lifter mechanism 30, an electric ball screw mechanism 34 which vertically moves the support base 31 is disposed.

In addition, Each of the support bars 32 includes a hinge which is bent forward, rearward, rightward, and leftward in the center portion thereof. The hinge is configured to be temporarily turned over in a case where right and left folding plates 76 and 77 or a rear folding plate 78, which will be described later, intrude toward the bottom surface side of the tray T. Moreover, although not illustrated, the support base 31 which is vertically moved is divided into a front section and rear section and is configured so as to be switched between the case of elevating only the front section and the case of integrally elevating the front section and the rear section.

(1-3) Roll Supporting Mechanism 4

The roll supporting mechanism 4 supports film rolls Ra and Rb. As illustrated in FIG. 2, the roll supporting mechanism 4 is disposed in a side section of the main body 1a. The roll supporting mechanism 4 is primarily constituted by two roll bars 41a and 41b.

The roll bars 41a and 41b are inserted through the film rolls Ra and Rb. The film rolls Ra and Rb are held by a holder or the like. The roll bars 41a and 41b are rotatably supported by the main body 1a in a cantilevered manner, and are inserted into paper cores of the film rolls Ra and Rb from open end portions on the front surface side thereof. The film rolls Ra and Rb are formed by winding the band-like films Fa and Fb having predetermined widths in many folds. The band-like film Fa and the band-like film Fb may have the same width or different widths from each other. In this embodiment, the band-like film Fa and the band-like film Fb have different widths from each other. One of the films is selected depending on the tray size.

Pulleys 42a and 42b are fixed to one ends of the roll bars 41a and 41b, and timing belts 43a and 43b are wound around the pulleys 42a and 42b. The roll bars 41a and 41b are arranged to be shifted from each other in vertical and horizontal directions. The timing belts 43a and 43b are driven by a single film roll drive motor 45. Rotation of the film roll drive motor 45 is transmitted to the pulley 42a on the film roll Ra side via a gear 46.

The film roll drive motor 45 can be normally and reversely rotated. During normal rotation of the film roll drive motor 45 (counterclockwise rotation with respect to the sheet of FIG. 3), the film roll Ra through which the one roll bar 41a is inserted is rotated clockwise, and the band-like film Fa is unwound from the film roll Ra. In addition, during reverse rotation of the film roll drive motor 45 (clockwise rotation with respect to the sheet of FIG. 3), the film roll Rb through which the other roll bar 41b is inserted is rotated clockwise, and the band-like film Fb is unwound from the film roll Rb. One-way clutches 44a and 44b are provided between the timing belts 43a and 43b and the film roll drive motor 45 so as not to allow the film rolls Ra and Rb to rotate in a direction in which the band-like films Fa and Fb are wound.

(1-4) Film Delivery Mechanism 5

The film delivery mechanism 5 is a mechanism which transports the band-like films Fa and Fb, which are unwound from the film rolls Ra and Rb, to a pair of feeder units 61 and 62 of the film conveyance mechanism 6, which will be described later. As illustrated in FIG. 3, the film delivery mechanism 5 is primarily constituted by a film insertion plate unit 51, a film insertion plate drive motor 53 which rotates the film insertion plate unit 51 around a rotating shaft 52, and a crank mechanism (not illustrated) which horizontally moves the film insertion plate unit 51.

As illustrated in FIG. 3, the film insertion plate unit 51 is disposed above the film rolls Ra and Rb supported by the roll supporting mechanism 4. The film insertion plate unit 51 includes a first film insertion plate 51a constituted by two plate members 57a and 58a, and a second film insertion plate 51b constituted by two plate members 57b and 58b. The first film insertion plate 51a and the second film insertion plate 51b are supported by the rotating shaft 52.

The film insertion plate drive motor 53 rotates the film insertion plate unit 51 around the rotating shaft 52 in a predetermined range. For example, the film insertion plate 51 can be positioned at a first position (a position illustrated in FIG. 3) and a second position (a position illustrated in FIG. 5) provided lower than the first position, by the film insertion plate drive motor 53. In addition, the film insertion plate unit 51 is positioned at any one of the first position and the second position while the band-like film Fa or the band-like film Fb is transported from the film delivery mechanism 5 to the film conveyance mechanism 6.

Selection of the position of the film insertion plate unit 51 is determined by whether the band-like film Fa or the band-like film Fb is used. In the case of using the band-like film Fb, the film insertion plate unit 51 is positioned at the first position. In the case of using the band-like film Fa, the film insertion plate unit 51 is positioned at the second position.

The crank mechanism (not illustrated) horizontally moves the film insertion plate unit 51 toward the film conveyance mechanism 6. Accordingly, the film delivery mechanism 5 can transport the band-like films Fa and Fb unwound from the film rolls Ra and Rb held by the roll supporting mechanism 4 to the film conveyance mechanism 6.

(1-5) Film Conveyance Mechanism 6

The film conveyance mechanism 6 receives the band-like films Fa and Fb from the film delivery mechanism 5, transports the band-like films Fa and Fb to the packaging station 3 while feeding the band-like films Fa and Fb in the film longitudinal direction, and cuts the band-like films Fa and Fb into a predetermined length. As illustrated in FIG. 6, the film conveyance mechanism 6 is constituted by the first feeder unit 61 disposed in the front surface side portion of the main body 1a, the second feeder unit 62 disposed in the rear surface side portion, a first feeder moving unit 63 and a second feeder moving unit 64 which change the relative distance between the first feeder unit 61 and the second feeder unit 62, a feeder driving unit 65 which allows belts of both the feeder units 61 and 62 to run, and a cutter mechanism 69 which cuts the band-like films Fa and Fb into a predetermined length (see FIGS. 3 to 5).

The first feeder unit 61 and the second feeder unit 62 interpose both side portions of the band-like films Fa and Fb in the width direction, which are held by the film insertion plate unit 51, between upper and lower belts, and transport the band-like films Fa and Fb by the feeder driving unit 65 in a direction of arrow A1 in FIG. 3.

A pair of slide shafts 66 and 67 illustrated in FIGS. 3 and 4 are provided at both ends of the first feeder unit 61 and the second feeder unit 62 in the film longitudinal direction. The feeder units 61 and 62 are mounted to slide on both the shafts 66 and 67 to be relatively moved in the film width direction. In addition, the first feeder unit 61 is connected to the first feeder moving unit 63 and is movable along the slide shafts 66 and 67. The second feeder unit 62 is connected to the second feeder moving unit 64 and is movable along the slide shafts 66 and 67.

<Stretch Amount and Shift Amount>

In addition, after the films Fa and Fb are transported to the packaging station 3, the stretch amount of the films can be increased or decreased by moving the feeder units 61 and 62 by predetermined amounts in a direction in which the feeder units 61 and 62 become separated from each other. In addition, by moving the feeder units 61 and 62 rearward by predetermined amounts, the relative position between the films Fa and Fb stretched in the packaging station 3 and the tray T pushed upward from below can be changed. This relative position can be adjusted as a "shift amount", which will be described later. When the relative position is appropriate, the films Fa and Fb can be folded around the tray T with well-balanced front-to-rear widths.

The positions of the first feeder unit 61 and the second feeder unit 62 when receiving the band-like films Fa and Fb from the film delivery mechanism 5 are determined according to the length of the transported band-like films in the width direction. Therefore, a sensor (not illustrated) which detects end portions of the band-like films Fa and Fb in the width direction is provided. In addition, the first feeder unit 61 and the second feeder unit 62 are provided with a center clamp and right and left clamps positioned on both sides of the center clamp along the longitudinal direction of the films. The clamps are separately operated by clamp driving solenoids, and hold and release both side portions in the width direction of the films Fa and Fb which are cut by the cutter mechanism 69.

<Film Tension and Right and Left Tightening Amount>

By adjusting film opening timings using the clamps, the tension of the films Fa and Fb can be increased or decreased when the article to be packaged is wrapped. That is, when the films Fa and Fb are opened at a point of time when the right and left folding plates 76 and 77, which will be described later, shallowly advance toward the lower surface of the tray T, the tension of the film in the rightward and leftward directions is decreased. Conversely, when the films Fa and Fb are opened at a point of time when the right and left folding plates 76 and 77 deeply advance toward the lower surface of the tray T, the tension of the film in the rightward and leftward directions is increased. Similarly, when the films Fa and Fb are opened at a timing at which the rear folding plate 78 shallowly advances toward the lower surface of the tray T, the tension of the film on the rear surface side is decreased. On the other hand, when films Fa and Fb are opened at a timing at which the rear folding plate 78 deeply advances toward the lower surface of the tray T, the tension of the film on the rear surface side is increased. In addition, by shifting the film opening timings of the clamps positioned at the center and on both sides thereof, "right and left tightening amounts" of the films which are folded toward the lower surface of the tray T can be increased or decreased. This adjustment will be described later.

As illustrated in FIGS. 3 and 4, the cutter mechanism 69 is provided on the upstream side of the film conveyance mechanism 6 in the film conveyance direction. After the film conveyance mechanism 6 transports the band-like films Fa and Fb transported from the film delivery mechanism 5 to the film conveyance mechanism 6 by a predetermined amount, the cutter mechanism 69 cuts the band-like films Fa and Fb between both the mechanisms 5 and 6. The cutter mechanism 69 has a cutting blade which is longer than the film width. By moving the cutting blade using a cutter driving solenoid 69a, the band-like films Fa and Fb are cut by the cutter mechanism 69.

In addition, by changing an operation timing of the cutter driving solenoid 69a, the cut length of the films Fa and Fb is increased or decreased.

(1-6) Folding Mechanism 7

As illustrated in FIGS. 3 and 4, the folding mechanism 7 includes the right and left folding plates 76 and 77, the rear folding plate 78, and a front folding rod 79. The right and left folding plates 76 and 77 are configured to horizontally move in the longitudinal direction of the films Fa and Fb by right and left folding plate driving motors (not illustrated) and timing belts. The right and left folding plates 76 and 77 fold the peripheral edge portions (both side edge portions in the film longitudinal direction) of the films Fa and Fb which protrude from the bottom surface of the tray T toward the bottom surface of the tray T. The rear folding plate 78 is configured to horizontally move toward the front surface side from the rear surface side of the main body 1a in the width direction of the films Fa and Fb by a rear folding plate driving motor (not illustrated) and a timing belt. The rear folding plate 78 folds the rear surface side edge portions of the films Fa and Fb which protrude from the bottom surface of the tray T toward the bottom surface of the tray T.

The front folding rod 79 folds the edge portions of the films Fa and Fb on the front surface side in the width direction toward the rear surface side. The front folding rod 79 is disposed between the packaging station 3 and the sealing mechanism 8, which will be described later. The front folding rod 79 folds the films Fa and Fb on the front surface side toward the rear surface side in a process of discharging the tray T toward the sealing mechanism 8 using a discharge pusher 75. In addition, a pressing mechanism 81 is disposed in the upper section of the packaging station 3. The pressing mechanism 81 prevents the tray T from losing its posture and overturning when the tray T that rides on the lifter mechanism 30 is pushed upward and stopped.

(1-7) Sealing Mechanism 8

The sealing mechanism 8 seals the films folded toward the bottom surface side of the tray T by the folding mechanism 7, using heat. The sealing mechanism 8 seals the bottom surface side of the tray T using heat when the tray T is pushed out by the discharge pusher 75. At this time, the above-mentioned pressing mechanism 81 has a function of pressing the bottom surface of the tray T against the upper surface of the sealing mechanism 8. Whether or not to operate the pressing mechanism 81 can be switched by a "tray press" operation, which will be described later.

(1-8) Discharge Table 11

The Discharge Table 11 to which the Tray T on which the commodity G is accommodated is discharged in a completely packaged state is provided on the front surface side of the sealing mechanism 8. A labeling machine 16 attaches a label printed and issued by a label printer 15 to the tray T with packaging completed. On the label, the trade name, weight, price, processing date, expiration date, and the like of the commodity G are printed.

(1-9) Tray Size Detecting Mechanism 12

The tray size detecting mechanism 12 is attached to the lower section of the discharge table 11. The detecting mechanism 12 is primarily constituted by a camera 121 (see FIG. 4), an image processing device (not illustrated), and a tray size calculating unit. The tray size detecting mechanism 12 detects the height dimension of the tray T and the planar size (width dimension and depth dimension) of the tray T obtained by the camera 121, and sends a size signal indicating the detected height dimension and planar size of the tray T to a control device 9.

(2) Control Device 9

Figure 7:
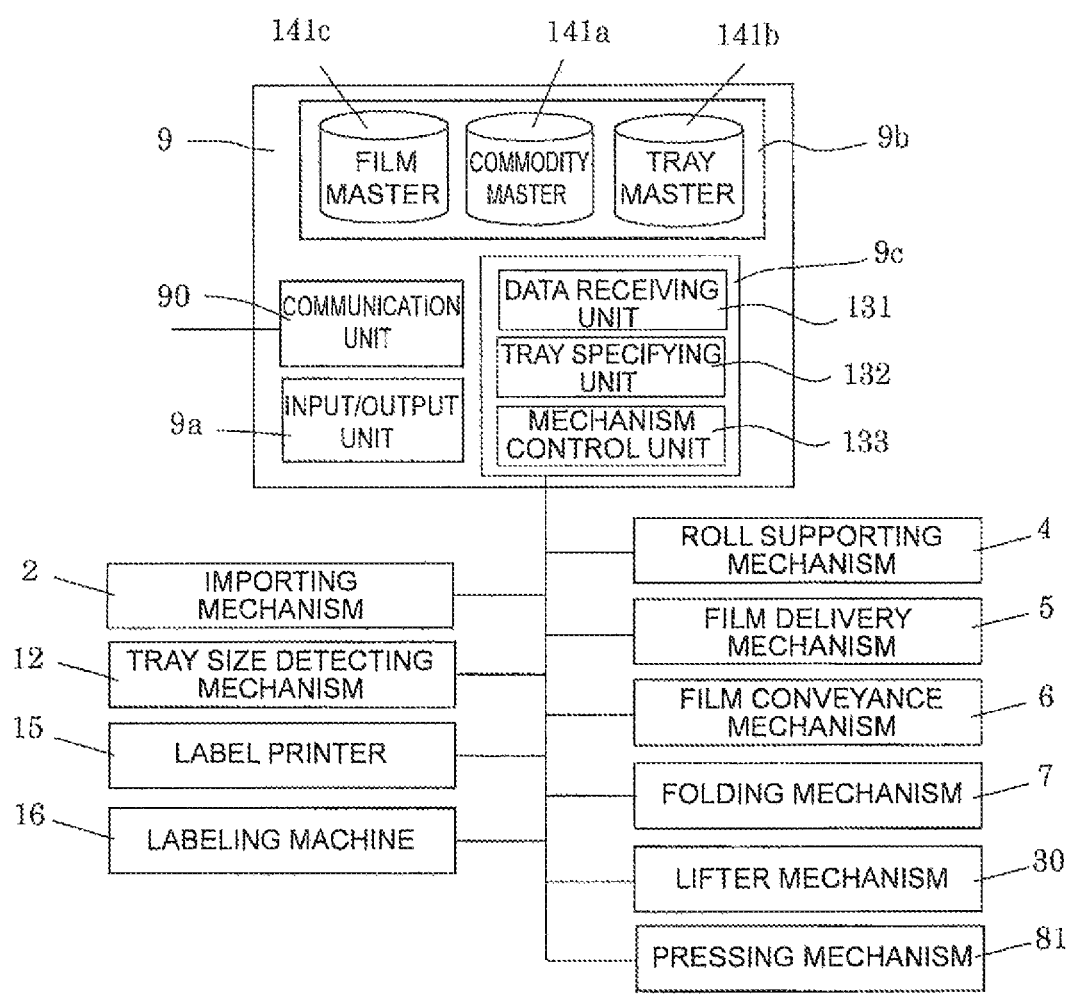
FIG. 7 is a control block diagram of a control device embedded in the packaging apparatus.

FIG. 7 illustrates a control block diagram of the control device 9 embedded in the packaging apparatus 1. In this figure, the control device 9 is disposed in the upper section of the main body 1a and controls the entirety of the packaging apparatus 1. The control device 9 is configured as a computer, and controls operations of mechanisms in the main body 1a by receiving the size signal from the tray size detecting mechanism 12 or on the basis of control parameters specified by a tray code or a film code which is set. The mechanisms are electrical control systems including various motors (the film insertion plate drive motor 53, a right and left folding plate driving motor 71, a rear folding plate driving motor 72, and the like), various solenoids (the cutter driving solenoid 69a, and a clamp driving solenoid 68), the feeder moving units 63 and 64, the feeder driving unit 65, a display panel 91, and the like. The control device 9 primarily includes the communication unit 90, an input/output unit 9a, the storage unit 9b, and the control unit 9c.

(2-1) Communication Unit 90

The communication unit 90 is a network interface device having connection terminals of communication lines, and for example, is a LAN card or a modem. The communication unit 90 is connected to the external server SV via a LAN cable and an Internet line IN in a store or directly via an Internet line IN. In addition, when control parameters corresponding to a tray code designated by the input/output unit 9a or a tray size are not registered in a tray master 141b, the communication unit 90 communicates with the external server SV and downloads the control parameters corresponding to the tray code designated by the input/output unit 9a or the tray size. As the communication result of the communication unit 90, when control parameters for a new tray are not registered in the external server SV, non-registration is informed. In this case, the control parameters for the new tray are set on the packaging apparatus 1 side. The setting operation thereof will be described later. When the new control parameters are set and registered, the communication unit 90 uploads the new control parameters to the external server SV.

In addition, the communication unit 90 communicates the external server SV regularly or each time when the packaging apparatus 1 is started up and downloads the tray master 141b in which the new control parameters are stored.

(2-2) Input/Output Unit 9a

The input/output unit 9a is primarily constituted by the display panel 91 and an operation key 92. The display panel 91 is a touch panel type display unit which displays information such as the trade name, weight, and price of the commodity G. An operation screen for setting the control parameters, which will be described later, is displayed on the display panel 91. In addition, in the operation key 92, in addition to a numeric keypad (not illustrated), a "call key" (not illustrated) for calling the control parameters of an input tray number is disposed.

(2-3) Storage Unit 9b

The storage unit 9b is configured as a RAM or a ROM or the like. The storage unit 9b stores, in addition to control programs, a commodity master 141a, the tray master 141b, a film master 141c, and the like.

As illustrated in FIG. 8, the commodity master 141a stores, in addition to the trade name, unit price, and the like, a single or a plurality of usable tray codes and film numbers (film codes) for each commodity number. When a commodity number is input through the input/output unit 9a and the call key is operated, the tray number of the commodity designated by the number is specified. In addition, the trade name and unit price called from the commodity master 141a are input to the label printer 15 and are printed on a label as printing information.

On the other hand, as illustrated in FIG. 9, the tray master 141b stores tray information, usable films, and control parameters in the case of using them, in association with each other. The tray information includes tray number, tray code, tray size (height, width, and depth), and the tare weight of the tray. The usable films specify films having a size that can wrap a tray having a corresponding tray size and are specified as film numbers. For example, the control parameters include a film cut length (a film length in a film longitudinal direction used for packaging) corresponding to a tray size and an adjustment value thereof, default values of the front, rear, right, and left tension when the film is wrapped around an article to be packaged and adjustment values thereof, adjustment values of "stretch amount" by which the film is stretched in advance, "shift amount" for determining the relative position between the film stretched in the packaging station 3 and the tray T, and "right and left tightening amounts" when the ends of the film are folded toward the lower surface of the tray T, and the like. In addition, setting of "lifting return", which will be described later, for slightly loosening the tension of the film to relieve an impact on the tray T when the article to be packaged is pushed upward toward the film stretched in the packaging station 3, setting of "tray press" for whether or not to operate the pressing mechanism 81, "lift switching", and the like are also included. The switching is to switch between areas of the lifter mechanism 30 in which the tray is placed. When "small" is set, only the front side portion of the support base 31 of the lifter mechanism 30 is raised. When "large" is set, the front side portion and the rear side portion of the support base 31 are integrally raised. These setting operations will be described later.

The commodity master 141a and the tray master 141b are linked by tray numbers. When a single commodity G corresponds to a single tray, the tray number is read. In addition, when a single commodity G corresponds to a plurality of trays, a single corresponding tray is read on the basis of size information from the tray size detecting mechanism 12. In addition, in a case where the tray size detecting mechanism 12 is not mounted, a plurality of corresponding tray numbers and sizes corresponding to the tray numbers are displayed on the display panel 91, and a tray having a size to be used is selected from among the tray numbers.

When a plurality of film numbers are registered for a single tray, before performing a packaging operation, a corresponding film number and a film width corresponding to the film number are read from the film master 141c of FIG. 10 and are displayed on the display panel 91. An operator designates a film number having an optimal film width on the basis of the displayed film width. In addition, when the film width of each of the film rolls Ra and Rb which are set in upper and lower stages is determined, the operator specifies a film used by selection operations of an "up" key and a "down" key, which will be described later. When the film number and the tray number to be used are specified in this manner, control parameters corresponding to these numbers are read. In addition, the tray master 141b can be downloaded from the external server SV, or may also be autonomously set and registered by an operation, which will be described later.

When the tray size is determined, a timing at which the folding mechanism 7 advances to the lower surface of the tray T is determined, and a time delayed from the timing to achieve an appropriate tension when the film is opened is obtained by a predetermined calculation expression. Values obtained as described above become default values. However, the values are stored only in the inside (for example, the RAM), and tray sizes for deriving the values are registered in the tray master 141b. The adjustment values for the front, rear, right, and left tension of the film illustrated in FIG. 9 are the adjustment values for the default values. For example, when the adjustment value is increased sequentially, the tension is increased in stages, and when the adjustment value is decreased, the tension is decreased in stages. This adjustment operation will also be described later.

FIG. 10 illustrates an example of the film master 141c. The film master 141c stores, in addition to the film codes (numbers), film widths and elongation rates thereof. In general, in the case of a tray T having a short depth, a film having a short transverse width is used, and in the case of a tray T having a long depth, a film having a long transverse width corresponding to the depth is used. Similarly to the tray master 141b, the film master 141c can be downloaded from the external server SV or can be set and registered by an operation, which will be described later.

(2-4) Control Unit 9c

The control unit 9c is configured as a CPU or the like. The control unit 9c primarily includes a data receiving unit 131, a tray specifying unit 132, and a mechanism control unit 133. The data receiving unit 131 receives the tray size detected by the tray size detecting mechanism 12, or input data such as the commodity number, tray number, and film number input from the input/output unit 9a. The tray specifying unit 132 specifies the tray number registered in the tray master 141b from the tray size, the commodity number, or the film number to be used, received by the data receiving unit 131. The mechanism control unit 133 reads the control parameters corresponding to the tray number specified by the tray specifying unit 132 and controls a plurality of electrical control systems on the basis of the control parameters.

Figure 11:
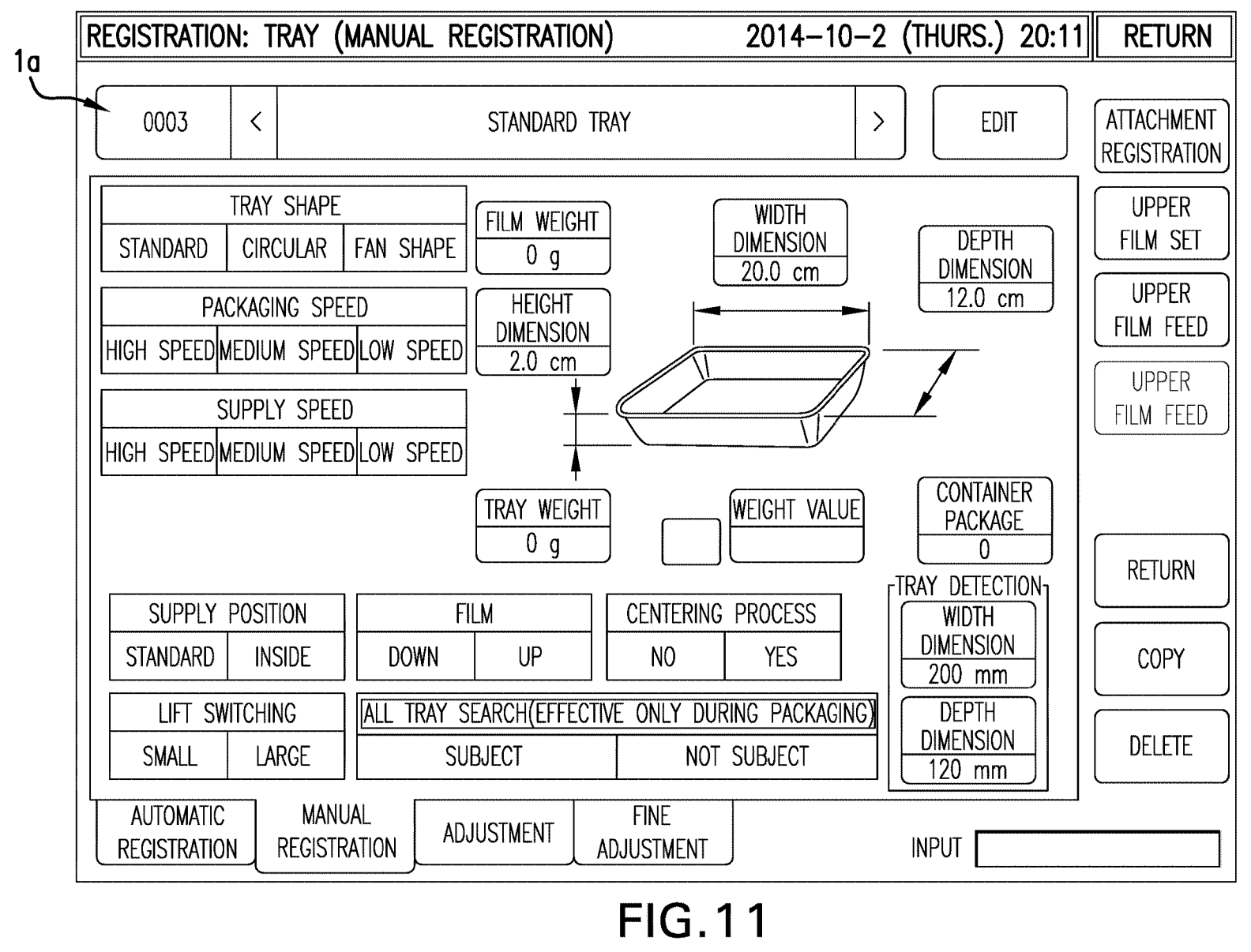
Figure 12:
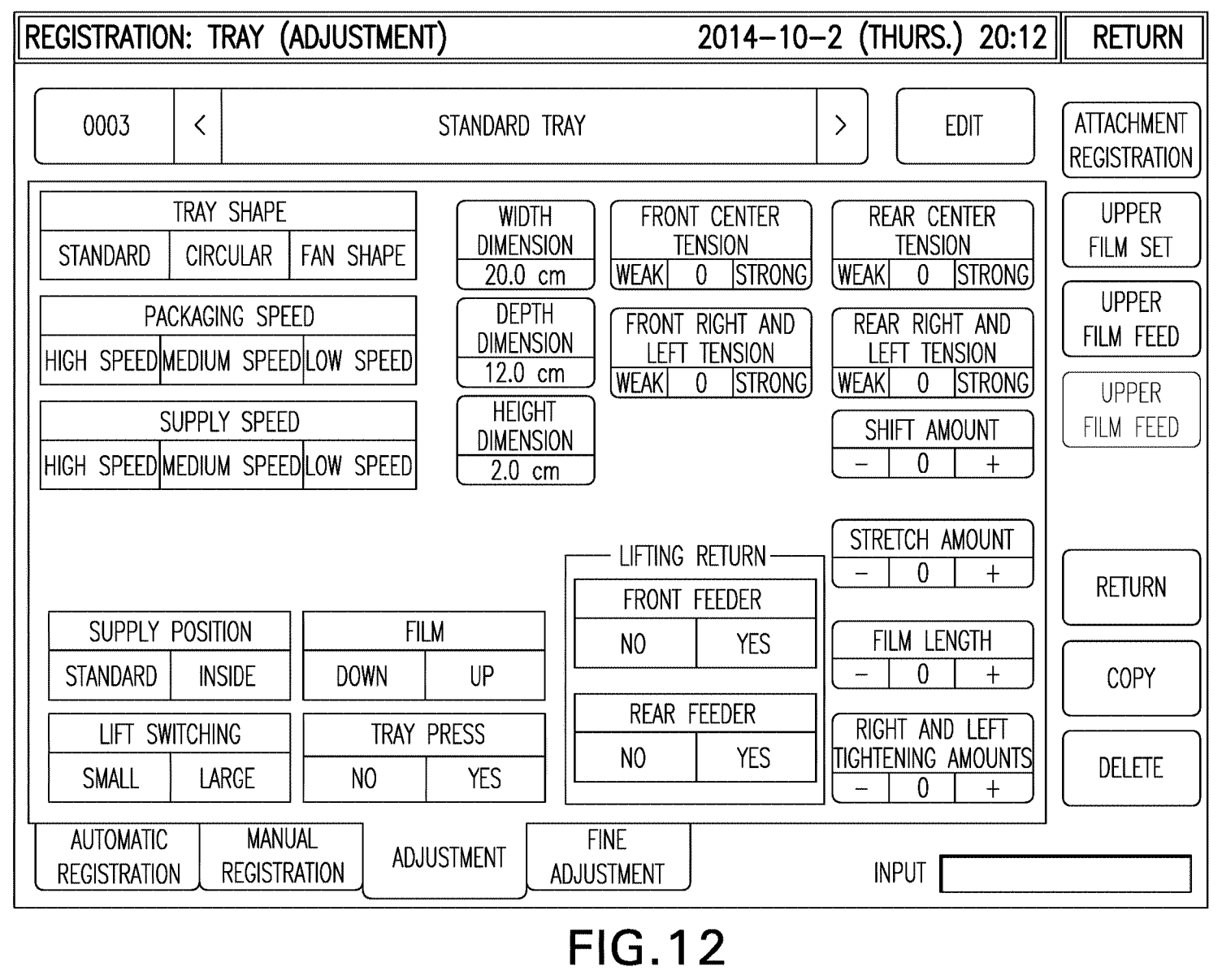

FIG. 11 illustrates an example of the operation screen displayed on the display panel 91 in a registration mode when the control parameters are manually set and registered. FIG. 12 illustrates an example of the adjustment screen when the control parameters are adjusted in further detail.

When the packaging apparatus 1 is set to the registration mode, a tray number is input through the numeric keypad of the operation key 92, and the "call" key (not illustrated) of the operation key 92 is subsequently pressed, the screen illustrated in FIG. 11 appears. The input tray number is displayed on an upper left corner 1a of this screen. Other numeric display sections are initially blank sections. In addition, when the key of any of "standard", "circular", "fan shape" of "tray shape" is touched (selected), the tray shape is designated, and the designated shape is displayed on the next display section. In FIG. 11, the "standard" key is pressed, and thus a "standard tray" is displayed on the right display section. Below the section, the figure of the designated tray, and figures showing the directions of the sizes (the width dimension, depth dimension, and height dimension) are displayed. In addition, when a numerical value of each size is input through the operation key 92 and the corresponding numerical value display section is touched, the input numerical value is displayed on the touched display section. When each dimension is input and the corresponding display section is touched in the same manner, as in FIG. 11, the input dimension is displayed on the corresponding numerical value display section. The tray weight (tare weight) or the tray detection size (the width dimension and depth dimension) detected by the tray size detecting mechanism 12 can be displayed by the same operation.

In this screen, "supply position" in the lower section is a setting for designating a stop position when the tray is supplied to the lifter mechanism 30. When a "standard" key is touched, the tray is supplied to the vicinity of the front surface of the lifter mechanism 30. When an "inside" key is touched, the tray is supplied to the vicinity of the slightly rear surface thereof. In addition, when a "down" key of "film" is touched, the film roll Ra in the lower stage is designated, and an "up" key is touched, the film roll Rb in the upper stage is designated. A "centering process" is a setting of whether or not to perform centering on the tray in the middle of the movement of the tray toward the lifter mechanism 30. In addition, when a tray having a short depth is used, a "small" key representing that only the front side portion of the support base 31 of the "lifter mechanism" is used may be touched, and when a tray having a long depth is used, a "large" key representing that the front side portion and the rear side portion of the support base 31 are used may be touched. In addition, "lifting return" is a setting of slightly relieving the tension of the film by allowing the front and rear film conveyance mechanism 6 (clamp mechanism) to slightly approach the tray T side.

When the registration of the basic setting items of the tray and the film is completed as described above, the control parameters are registered in the tray master 141b. By feeding the tray T in which the commodity G is put to the packaging station 3 in this state, trial packaging is performed. In addition, when adjustment is further needed by examining the packaged state, an "adjustment" key in the lowermost section of FIG. 11 is touched. When the "adjustment" key is touched, the screen displayed on the display panel 91 is switched to the screen of FIG. 12.

FIG. 12 illustrates the screen for adjusting the set control parameters in further detail. In this screen, the tension of the film, "shift amount", "stretch amount", "film length", "right and left tightening amounts", and the like can be adjusted.

As described above, the tension of the film can be adjusted by changing the film opening time by the clamps. In addition, the clamps are disposed in the front and rear of the film, there are the center clamp and the right and left clamps positioned on both sides thereof. By adjusting a delay time until the right and left films are opened after the right and left folding plates 76 and 77 start to come into contact with the films, the tension of each of the right and left films is increased or decreased. By adjusting a delay time until the rear side film is opened after the rear folding plate 78 starts to come into contact with the film, the tension of the rear side film is increased or decreased. Furthermore, by adjusting the film opening time by the front side center clamp when the tray T rides on the front folding rod 79 and the front side film is folded toward the lower surface of the tray T, the tension of the front side film is increased or decreased.

Here, in FIG. 12, "front center tension", "rear center tension", "front right and left tension", and "rear right and left tension" items are prepared. In each of the items when "strong" is touched, the tension of the corresponding clamp side is increased by a level, and when "weak" is touched, the tension of the corresponding clamp side is decreased by a level. Similarly, regarding "shift amount", "stretch amount", "film length", and "right and left tightening amounts", when a "+" key or a "−" key is operated, each setting value is increased or decreased in stages.

When such adjustment is performed, the control parameters of the tray master 141b at this time are stored or updated. In addition, trial packaging and adjustment are repeated until an optimal packaged state is achieved. When the optimal packaged state is confirmed, a subsequent tray number is input, and a setting operation for the subsequent tray is performed. Otherwise, the packaging apparatus 1 is returned to its normal mode. When the packaging apparatus 1 is returned to the normal mode, or at the time of regular updating, the communication unit 90 uploads the new updated control parameters or the tray master 141b that stores the corresponding control parameters to the external server SV.

(3) Packaging Operation of Packaging Apparatus 1

Next, a packaging operation based on the set control parameters will be described with reference to FIGS. 13 to 17. The following operation control is performed by the control device 9.

Figure 13:
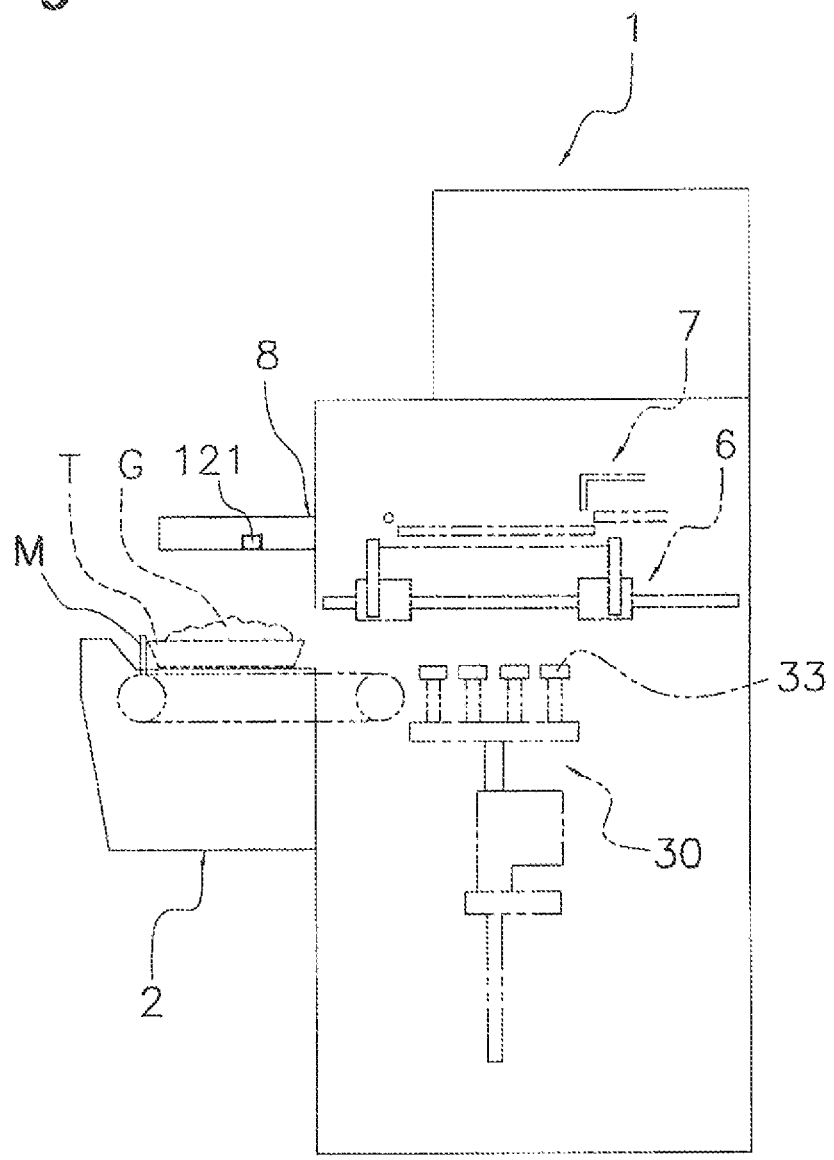
FIG. 13 is an explanatory view illustrating an operation of the packaging apparatus.
Figure 14:
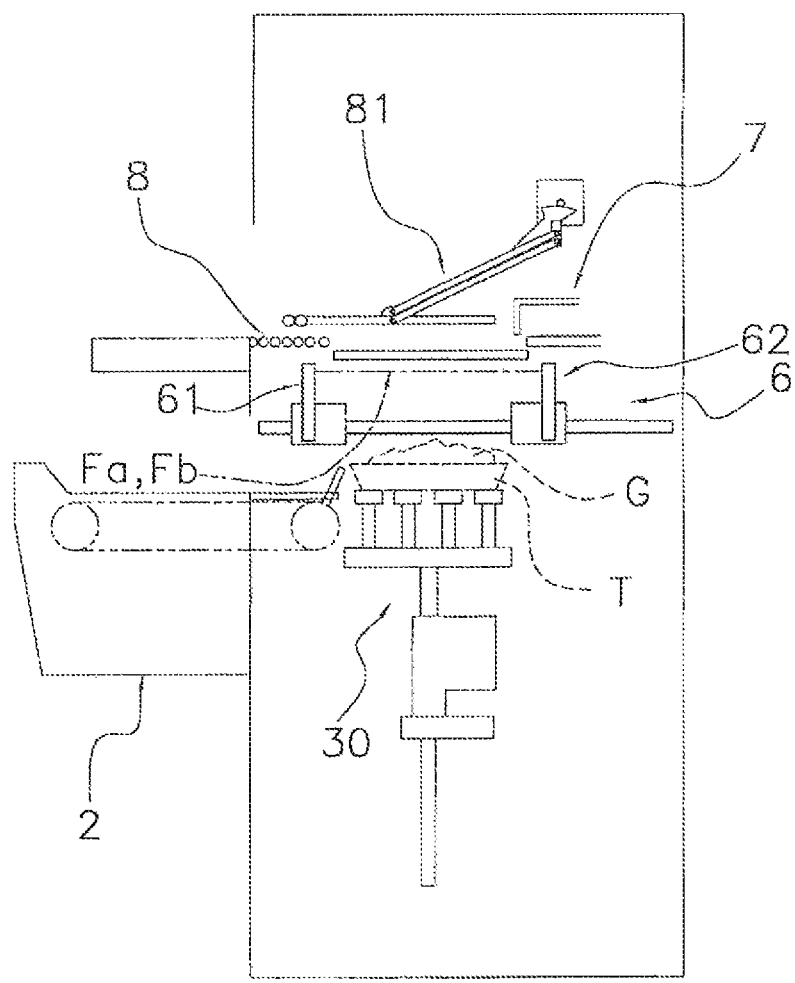
FIG. 14 is an explanatory view illustrating the operation of the packaging apparatus.

First, the operator inputs the commodity number of a commodity G to be packaged through the display panel 91 or the operation key 92. Next, as illustrated in FIG. 13, the operator places a tray T on which the commodity G is accommodated on the weighing instrument 21 of the importing mechanism 2. In addition, when a measured value is stable and weighing is completed, the importing belt 23 starts to move, and the lug M attached to the importing belt 23 moves from the front surface side to the rear surface side while pressing the tray T. Accordingly, the tray T is pushed onto the support members 33 of the lifter mechanism 30 (see FIG. 14).

In the above-described transporting process, the tray size detecting mechanism 12 calculates the size of the tray T and transmits the results to the control device 9. The control unit 9c of the control device 9 executes the tray specifying unit 132 of the control unit 9c on the basis of the received tray data. The tray specifying unit 132 specifies a tray number in which the tray dimensions registered in the tray master 141b are matched to the received dimensions of the tray T or a tray number in which the dimensions are closest to each other. Here, the tray specifying unit 132 specifies the tray number by using all the dimensions including the height, width, and depth of the tray T detected by the tray size detecting mechanism 12, and may also specify the tray number by using two values including the width dimension and the depth dimension.

In addition, when the specified tray number is stored in the tray master 141b of the storage unit 9b, the mechanism control unit 133 of the control unit 9c reads control parameters corresponding to the specified tray number, and controls each of the electrical control systems on the basis of the corresponding control parameters. Specifically, the mechanism control unit 133 unwinds the film by controlling the film roll drive motor 45 of the designated films Fa and Fb, the film insertion plate drive motor 53, and the feeder moving units 63 and 64. In addition, the mechanism control unit 133 controls the driving timings of the feeder driving unit 65 and the cutter driving solenoid 69a according to a film cut length. In addition, the mechanism control unit 133 controls the operation timings of the folding plate driving motors 71 and 72 and the driving timing of the clamp driving solenoid 68 according to the folding operation timing and the film opening timing by the clamps. However, in a case where the specified tray number corresponding to the input commodity number is not registered in the commodity master 141a, the mechanism control unit 133 displays a warning on the display panel 91 and stops the packaging operation. Otherwise, the mechanism control unit 133 operates the communication unit 90 and continues operating by downloading the control parameters of the corresponding tray code or the tray master in which the control parameters are registered, from the external server SV.

On the other hand, the tray number is specified and the film to be used is specified, the films Fa and Fb are transported from the film rolls Ra and Rb to the film conveyance mechanism 6 by the film delivery mechanism 5. The films Fa and Fb transported to the film conveyance mechanism 6 are moved to the upper side of the lifter mechanism 30 by the first feeder unit 61 and the second feeder unit 62. In addition, on the upper side of the lifter mechanism 30, both side portions of the films Fa and Fb in the width direction are in a state of being held by the operation of each of the clamps. Subsequently, the mechanism control unit 133 stretches the film, which is stretched in the packaging station 3, in advance by moving the feeder units 61 and 62 by predetermined amounts according to the set "stretch amount" and "shift amount", and determines the relative position between the film and the tray T.

Figure 15:
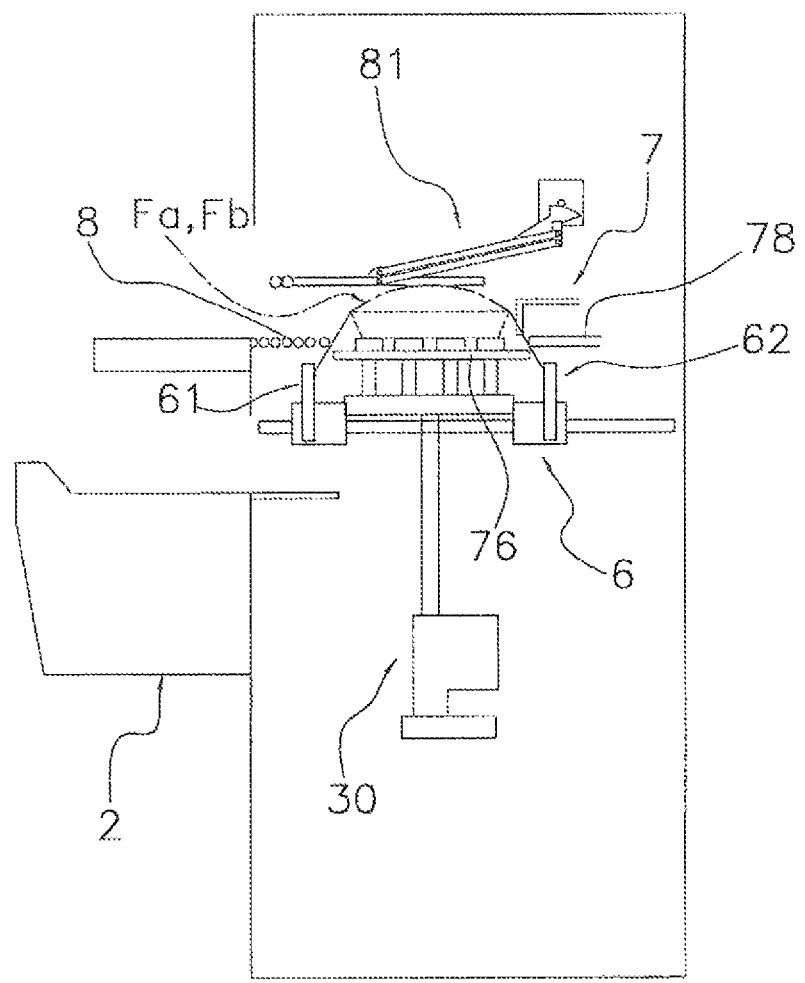
FIG. 15 is an explanatory view illustrating the operation of the packaging apparatus.
Figure 16:
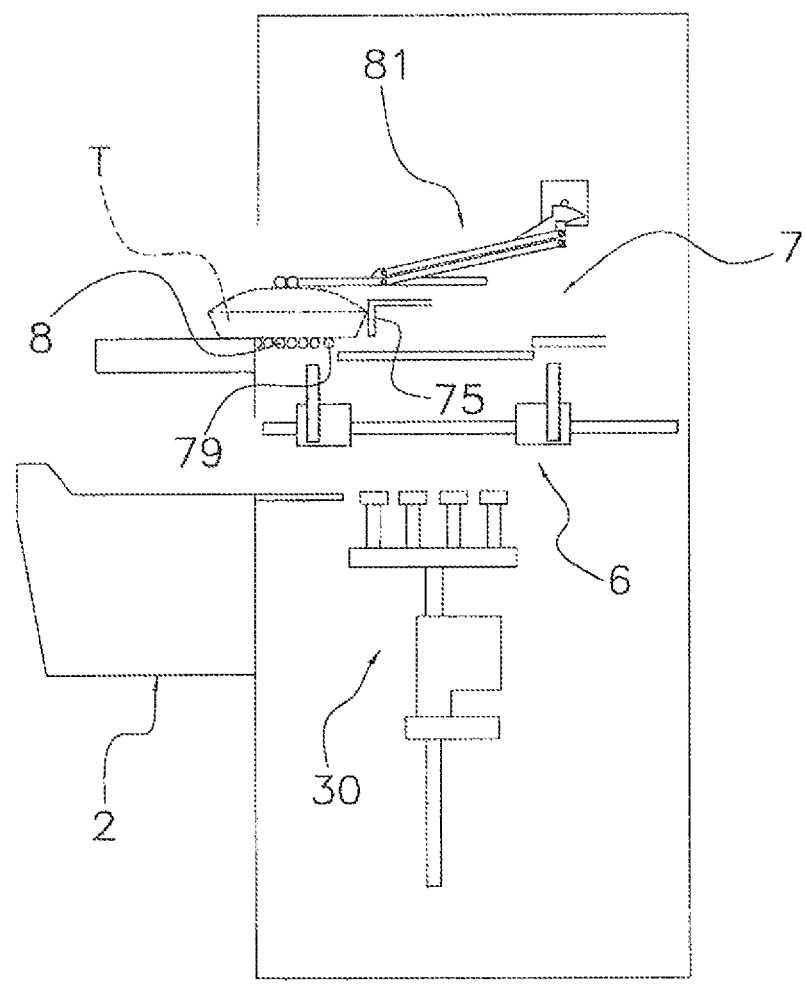
FIG. 16 is an explanatory view illustrating the operation of the packaging apparatus.
Figure 17:
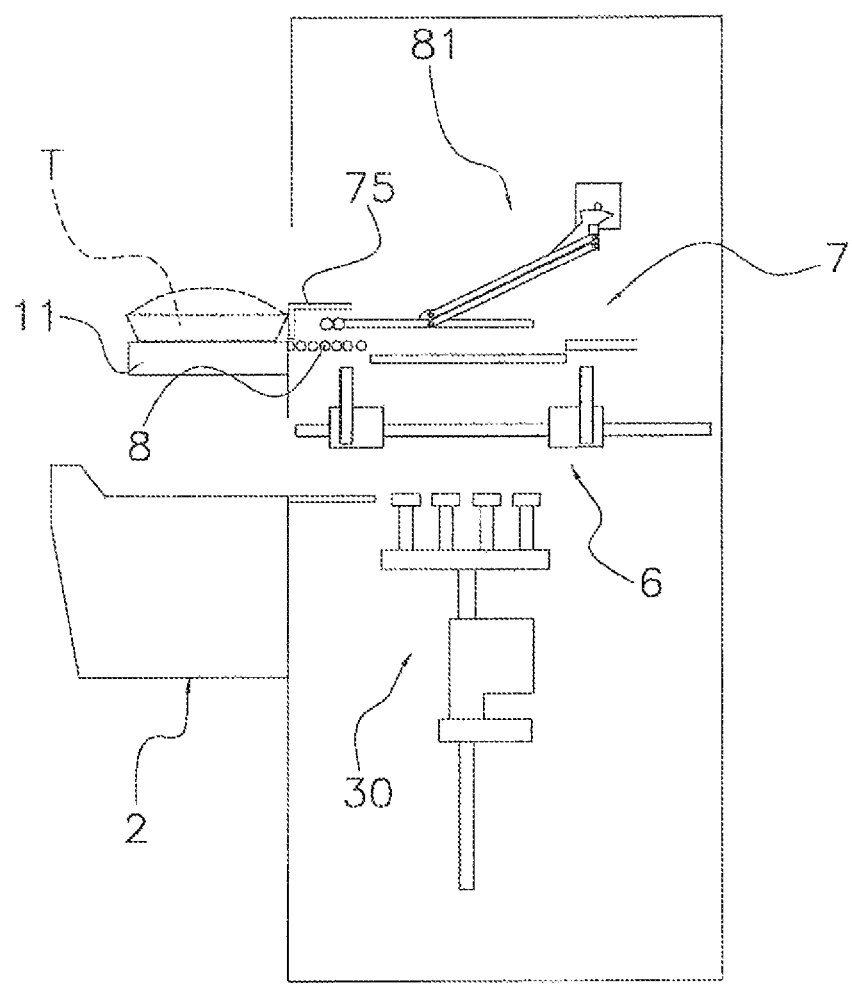
FIG. 17 is an explanatory view illustrating the operation of the packaging apparatus.

Next, for the films Fa and Fb held by each of the clamps, the ball screw mechanism 34 is operated and the support base 31 on which the tray T is placed is pushed upward (see FIG. 15). Accordingly, the films Fa and Fb held by each of the clamps are stretched to cover the upper portion of the commodity G and the tray T.

In this state, when the rear folding plate 78 and the right and left folding plates 76 and 77 are horizontally moved toward the lower side of the tray T, the holding of the films Fa and Fb by each of the clamps is released by a set timing. Accordingly, three peripheral sides of the films Fa and Fb are folded toward the lower side of the tray T (see FIG. 16). In addition, when the discharge pusher 75 pushes the tray T toward the sealing mechanism 8 side, one side of the films Fa and Fb on the front surface side, which has not been folded, abuts the front folding rod 79 and is folded toward the lower side of the tray T as the tray T is moved toward the sealing mechanism 8 side. At this time, the clamp on the front surface side releases holding of the films Fa and Fb at a set timing. In addition, the films Fa and Fb folded toward the lower side of the tray T are sealed by the sealing mechanism 8 using heat during the movement of the tray T. When the tray T is discharged to a position illustrated in FIG. 17, the entirety of the commodity G and the tray T is in a state of being covered with the films Fa and Fb.

Furthermore, the mechanism control unit 133 obtains the weight of the commodity G by subtracting the tare weight of the tray T registered in the tray master 141*b* from the measured value. Finally, price of the commodity calculated on the basis of unit price registered in the commodity master 141*a* and the weight of the commodity G, weight, and the like are printed and issued on a label by the label printer 15. The label is attached to the tray T with packaging completed by the labeling machine 16.

As described above, in the packaging apparatus 1 of this embodiment, the packaging operation is performed on the basis of the control parameters registered in the tray master 141*b*.

While the embodiment of the present invention has been described above, the present invention is not limited thereto, and may employ other embodiments. For example, the above-described embodiment is on the premise that control parameters for the same type of model having the same specification are stored. However, a configuration in which control parameters are provided with a model code of a packaging apparatus which uses the control parameter and the stored control parameters are shared by packaging apparatuses having the same model code may also be employed. In this case, control parameters of various types of models can be uploaded to the cloud and subjected to unified management. In addition, the communication unit may regularly back up, not only information of the tray master including the control parameters, but also commodity masters and tray masters held in an own apparatus and all the other data and programs, to the external server along with the IP address or URL of the apparatus. Accordingly, even when the data in the own apparatus becomes unavailable, by installing backup data regarding the own apparatus from the external server when the hard section is recovered, the own apparatus can be recovered to its original use state within a short period of time and can be used again.

According to an aspect of the present invention, new control parameters set and registered in a single packaging apparatus can be used for other packaging apparatuses. In addition, in each of the packaging apparatuses, a setting operation for packaging an article to be packaged in an optimal state does not need to be individually performed. Accordingly, a registration operation individually performed by a provider on each apparatus by visiting each store can be significantly saved. Therefore, even in the case of using a tray or film having a special shape, each of apparatuses that are used across the country can easily perform packaging in an optimal state only by installing appropriate control parameters. Accordingly, an operator who is unaccustomed to the operation can handle the packaging apparatus.

What is claimed is:

1. A packaging system formed by connecting an external server to a plurality of packaging apparatuses via a network, wherein the external server stores control parameters for the packaging apparatuses to package a first article to be packaged with a first film, the control parameters including a parameter set, which is specified by a tray code or a film code, including two or more of a plurality of parameters associated with each other that include a film cut length corresponding to a tray size, an adjustment value of tension on the first film during wrapping, a stretch amount for stretch of the first film in advance of packaging corresponding to material property of the film, a shift amount for relative position of the stretched first film and the article to be packaged, a delay time until the first film is opened after a folding plate starts to come into contact with the first film to be wrapped onto the article to be packaged, and a lifting return, and the packaging apparatus includes
a communication unit configured to communicate with the external server and download the control parameters,
a storage unit configured to store the control parameters downloaded by the communication unit, and
a control unit configured to control a packaging operation on the basis of the control parameters stored in the storage unit, wherein, when the control unit determines that the control parameters are not stored in the storage unit, the control unit is configured to control the communication unit to automatically download the control parameters from the external server, wherein, when the control parameters are not stored in the storage unit and not registered in the external server, the control unit is configured to obtain newly set control parameters and configured to automatically control the communication unit to upload the newly set control parameters to the external server.

2. The packaging system according to claim 1, wherein the external server is a server device which provides a cloud computing service.

3. The packaging system according to claim 1, wherein the packaging apparatus is a stretch packaging apparatus which pushes up the article to be packaged from below toward a stretch film that is held in tension, and folds a peripheral edge portion of the stretch film toward a lower surface of the article to be packaged.

4. The packaging system according to claim 1, wherein, when control parameters for packaging by using a second article to be packaged, or a second film are newly set and registered in any packaging apparatus among the plurality of packaging apparatuses, the communication unit of the corresponding packaging apparatus uploads information regarding the article to be packaged and the control parameters for the second article to be packaged, the second film, or both the second article to be packaged and the second film to the external server.

5. The packaging system according to claim 1, wherein a tray master stored in the storage unit stores, for each of a plurality of tray numbers, a tray size corresponding to each of the plurality of tray numbers and control parameters corresponding to each of the plurality of tray sizes.

6. The packaging system according to claim 1, wherein the packaging apparatus includes a tray size detecting mechanism configured to detect a tray size, wherein the control unit obtains a tray number corresponding to the tray size detected by the tray size detecting mechanism, and reads out or downloads the control parameters based on the tray number obtained.

7. The packaging system according to claim 1, wherein the control system is configured to obtain the tray code for a tray prior to obtaining dimensions for the tray, and is configured to download the control parameters corresponding to the tray code.

8. The packaging system according to claim 7, wherein the control system is configured to determine dimensions of the tray from the tray code.

9. The packaging system according to claim 7, wherein the control system obtains a commodity code for a product to be accommodated on the tray, and identifies the tray code from the commodity code.

10. The packaging system according to claim 1, wherein the control system is configured to determine a tray number from dimensions of a tray, and after the tray number is determined, the control system is configured to use the tray number to automatically download the control parameters corresponding to the tray number.

11. A packaging system formed by connecting an external server to a plurality of packaging apparatuses via a network, wherein
the external server stores control parameters for the packaging apparatuses to package a first article to be packaged with a first film, the control parameters include at least a film cut length, a stretch amount for stretch of the first film in advance of packaging, and a delay time until the first film is opened after a folding plate starts to come into contact with the first film to be wrapped onto the article to be packaged, and
the packaging apparatus includes
a communication unit configured to communicate with the external server and download the control parameters,
a storage unit configured to store the control parameters downloaded by the communication unit, and
a control unit configured to control a packaging operation on the basis of the control parameters stored in the storage unit,
wherein, when the control unit determines that the control parameters are not stored in the storage unit, the control unit is configured to control the communication unit to automatically download the control parameters from the external server,
wherein, when the control parameters are not stored in the storage unit and not registered in the external server, the control unit is configured to obtain newly set control parameters and configured to automatically control the communication unit to upload the newly set control parameters to the external server.

12. The packaging system according to claim 11, the control parameters specified by a tray code or a film code include tension on the first film during wrapping, a shift amount for relative position of the stretched first film and the article to be packaged, and a lifting return.

13. The packaging system according to claim 11,
wherein the packaging apparatus is a stretch packaging apparatus which pushes up the article to be packaged from below toward a stretch film that is held in tension, and folds a peripheral edge portion of the stretch film toward a lower surface of the article to be packaged.

14. The packaging system according to claim 11,
wherein, when control parameters for packaging by using a second article to be packaged, or a second film are newly set and registered in any packaging apparatus among the plurality of packaging apparatuses, the communication unit of the corresponding packaging apparatus uploads information regarding the article to be packaged and the control parameters for the second article to be packaged, the second film, or both the second article to be packaged and the second film to the external server.

15. The packaging system according to claim 11,
wherein a tray master stored in the storage unit stores, for each of a plurality of tray numbers, a tray size corresponding to each of the plurality of tray numbers and control parameters corresponding to each of the plurality of tray sizes.

16. The packaging system according to claim 11, wherein
the packaging apparatus includes a tray size detecting mechanism configured to detect a tray size,
wherein the control unit obtains a tray number corresponding to the tray size detected by the tray size detecting mechanism, and reads out or downloads the control parameters based on the tray number obtained.

17. The packaging system according to claim 11, wherein the control system is configured to obtain a tray code for a tray prior to obtaining dimensions for the tray, and is configured to download the control parameters corresponding to the tray code.

18. The packaging system according to claim 17, wherein the control system is configured to determine dimensions of the tray from the tray code.

19. The packaging system according to claim 17, wherein the control system obtains a commodity code for a product to be accommodated on the tray, and identifies the tray code from the commodity code.

20. The packaging system according to claim 11, wherein the control system is configured to determine a tray number from dimensions of a tray, and after the tray number is determined, the control system is configured to use the tray number to automatically download the control parameters corresponding to the tray number.

* * * * *